United States Patent [19]
Hummel et al.

[11] 3,751,625
[45] Aug. 7, 1973

[54] UNDERWATER TORCH

[75] Inventors: Jerry R. Hummel; Kenneth E. McCall, both of Lancaster, Ohio

[73] Assignee: Arcair Company, Lancaster, Ohio

[22] Filed: Mar. 1, 1972

[21] Appl. No.: 230,609

[52] U.S. Cl.................................. 219/70, 219/144
[51] Int. Cl............................................... B23k 9/28
[58] Field of Search............................... 219/70, 144

[56] References Cited
UNITED STATES PATENTS 2,417,650   3/1947   Kandel................................. 219/70
2,462,463   2/1949   Boot................................ 219/70 X Primary Examiner—R. F. Staubly
Attorney—James C. Simmons

[57] ABSTRACT

An underwater cutting and welding torch wherein in one embodiment the electrode is securely gripped by movable members held together by an elastic cover. The torch is further characterized in that a minimum of electrical conducting material is required resulting in a safer torch. An alternate apparatus for securing the electrode includes an elastic or elastomeric member that itself is one of the electrode gripping members.

4 Claims, 10 Drawing Figures

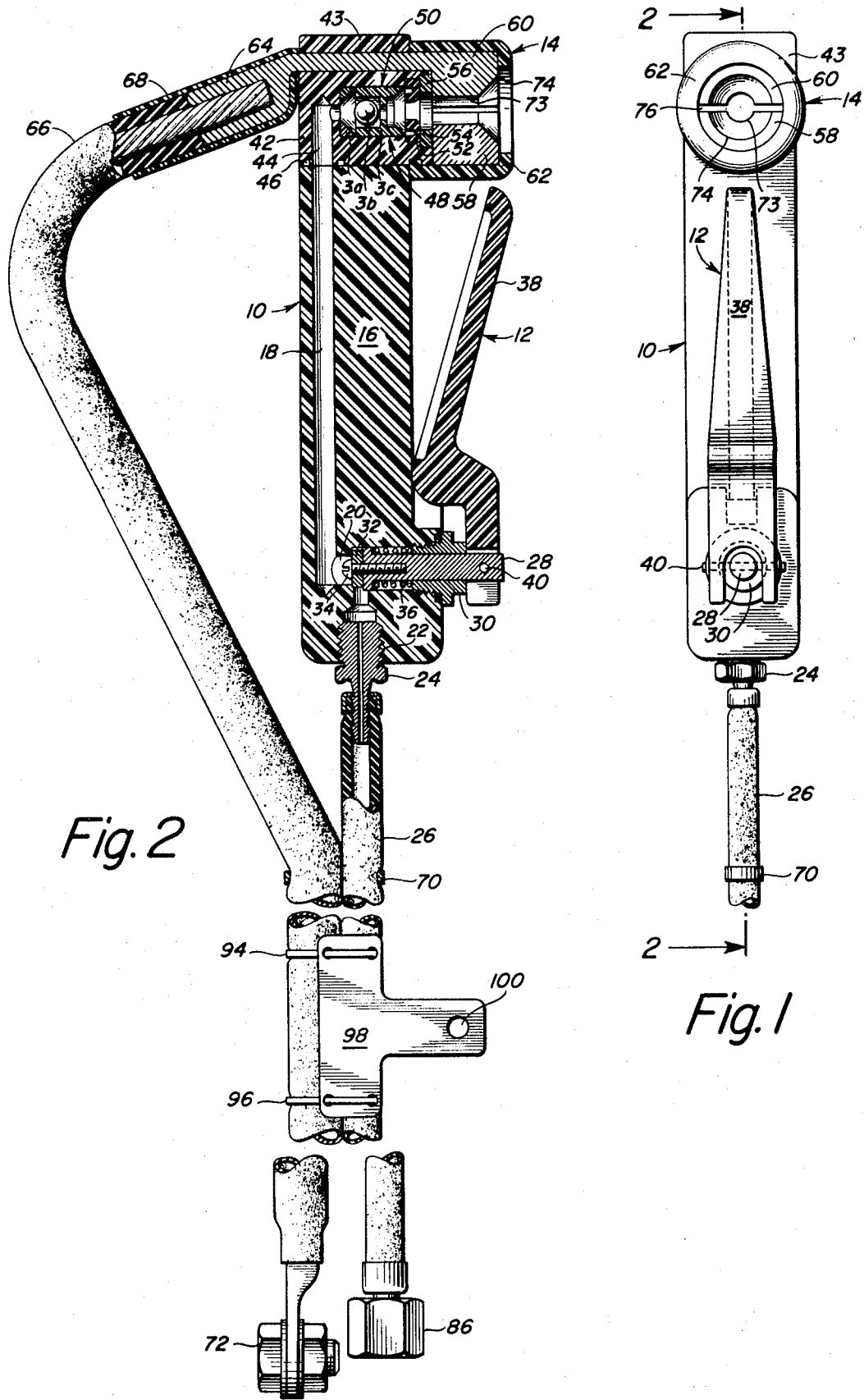

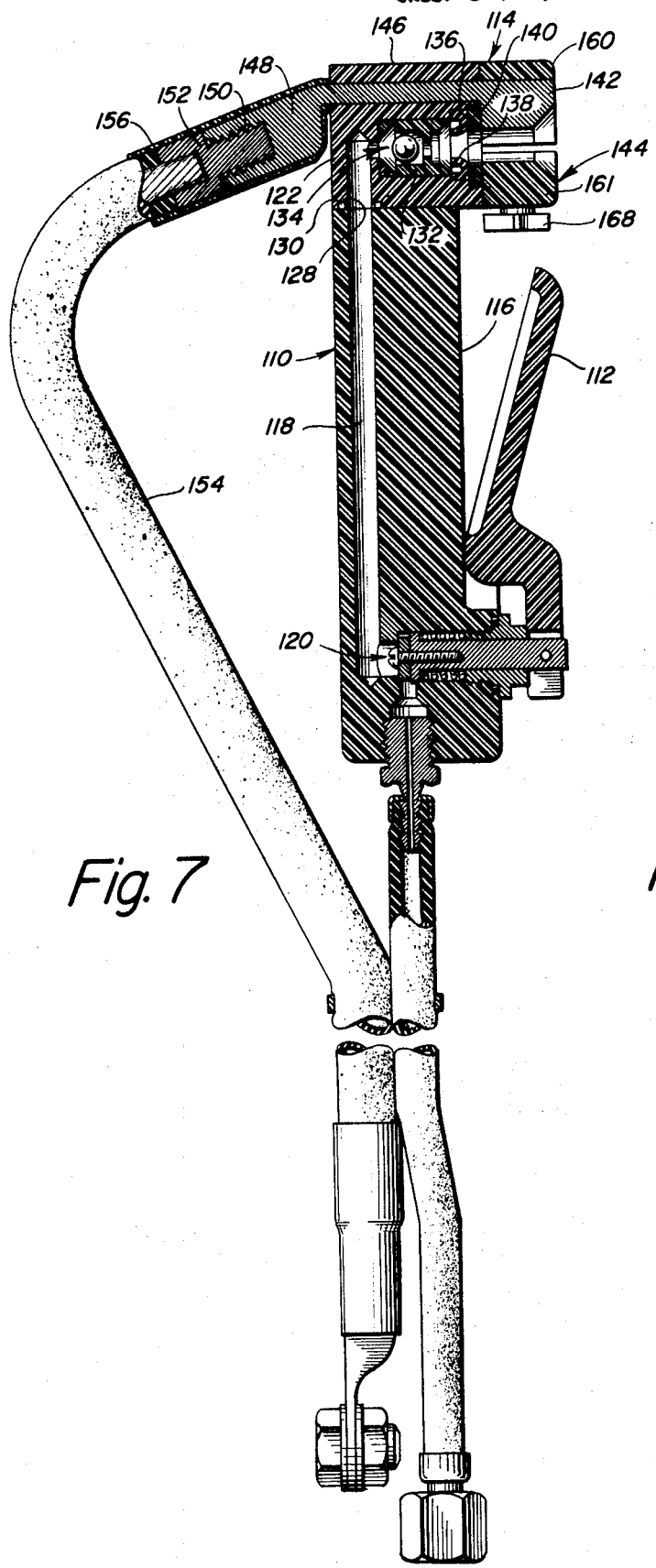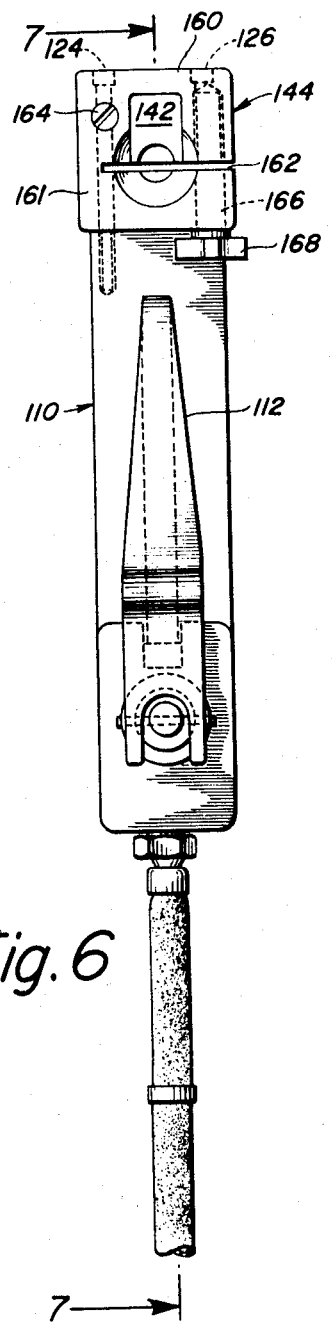

UNDERWATER TORCH

BACKGROUND OF THE INVENTION

This invention pertains to electric-arc cutting and welding torches and in particular electric-arc cutting and welding torches for use under water. Such torches are commonly used in salvaging sunken vessels; repairing floating vessels such as ships, barges and the like; and in construction, and maintenance of fixed structures such as bridges, oil drilling platforms and the like.

Examples of prior art underwater torches are shown in U. S. Pat. Nos. 2,396,307, 2,417,650, and 3,462,463. The second-named patent illustrates one torch currently used in the trade.

The underwater torches in commercial use generally have a tapered collet that is compressed by means of a screw threaded into a receiving member. During operation, because of scale, barnacles, and other foreign material and objects that have been in the water, the electric arc tends to extinguish frequently requiring a re-strike. This is known as pecking of the electrode and frequently causes the screw device holding the collet to work loose. This in turn causes the electrode to become loose resulting in arcing inside the torch head which in turn not only can damage the torch, but if severe, can injure the operator.

Cam actuated clamping devices are not ideal because of the large number of metal parts required for gripping the electrode and the fact that electrode pecking can cause the electrode to become loose with the problems set forth above. As the number of metal parts increases, the problems of insulating the torch increase and the weight is also increased.

Commercial torches are generally bulky, heavy and of complicated structure requiring a large number of parts and generally have exposed members that can deteriorate because of the electrical current in combination with an aqueous environment or because of the aqueous environment itself.

SUMMARY OF THE INVENTION

In order to avoid the above-described problems and to provide an improved underwater cutting and welding torch, it has been discovered that the electrode gripping means should comprise two members normally forced together by an elastomeric member. This method of gripping the electrode prevents loosening thereof during pecking and facilitates electrical insulating of the torch by minimizing the number of metallic parts in the torch. Eliminating metallic members and replacing them with lightweight, non-conducting materials results in a compact, lightweight, reliable and easily maintained cutting and welding torch that shows a minimum of deterioration when exposed to or operating in an aqueous environment.

Alternatively the elastic or elastomeric member can be a resilient non-conducting member that itself is one of the electrode gripping members so constructed to secure the electrode by a vise-like structure which includes a positive screw actuating member.

Therefore, it is the primary object of this invention to provide an improved underwater cutting and welding torch.

It is another object of this invention to provide an underwater torch employing a minimum number of electrical conducting members.

It is yet another object of this invention to provide an underwater torch utilizing elastic means for gripping the electrode.

It is still another object of this invention to provide a compact, lightweight, safe and durable underwater cutting and welding torch.

It is still a further object of this invention to provide a torch that is so constructed to provide maximum operator efficiency in an aqueous environment.

BRIEF DESCRIPTION OF THE DRAWING

FIG. 1 is a front elevational view of a torch according to the present invention.

FIG. 2 is a sectional view taken along lines 2—2 of FIG. 1 with added fragmentary portions illustrating hose and cable details.

FIG. 6 is a front elevational view of a third embodiment of the present invention.

FIG. 7 is a sectional view taken along lines 7—7 of FIG. 6 with added fragmentary portions illustrating hose and cable details.

DETAILED DESCRIPTION OF THE PREFERRED EMBODIMENTS

Figure 3:
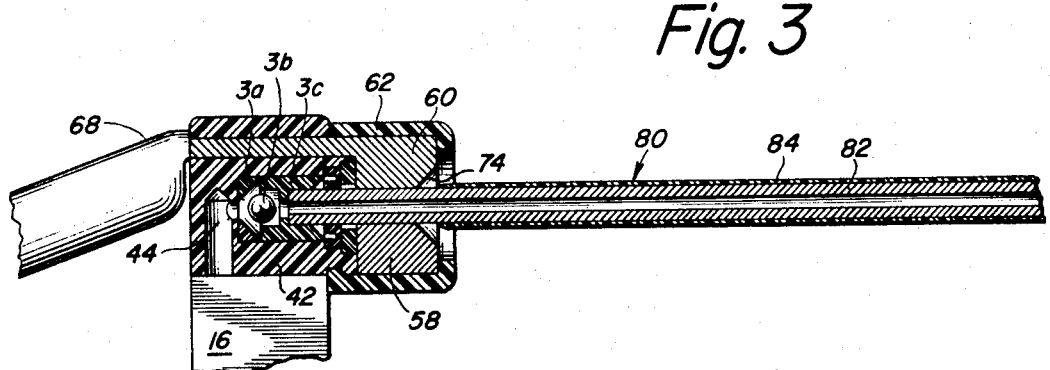
FIG. 3 is a fragmentary side view of the torch partially in section illustrating the electrode sealing apparatus.

There is shown in FIG. 1 an underwater cutting and welding torch designated generally as 10 having a gas operating lever assembly 12, and a head assembly 14.

The torch 10 has a torch body 16 having therein a fluid conduit 18 communicating with a valve bore 20 which in turn communicates with threaded aperture 22 which in turn receives a hose fitting 24 to which is attached a fluid conduit 26. Through conduit 26 a fluid such as oxygen gas is admitted to the torch.

Disposed within valve bore 20 is a valve stem 28 projecting outwardly of the torch body 16 through fluid tight fitting 30. The end of valve stem 28 within torch body 16 contains a sealing member 32 held in place by screw 34. The valve stem 28 is held in the normal closed position by means of spring 36. Outwardly of the torch body 16 is a gas operating lever 38 pivotably connected to valve stem 28 by means of pin connector 40. Thus by moving the lever 38 toward the torch body 16 the valve stem moves to the right admitting fluid to conduit 18.

Head 14 is mounted on torch body 16 and held in fluid-tight relation thereto. The head 14 comprises a head block 42 having a first fluid passage 44 communicating with fluid passage 18 in body 16. Sealing means 46, such as an "O-Ring," is included to prevent fluid leaks between the torch body 16 and the head block 42. Included in head block 42 is a second fluid passage 48 having disposed therein a check valve assembly 50. The check valve assembly 50 is included to prevent foreign material from flowing back into the torch thereby fouling the valve assembly. The check valve assembly 50 also prevents hot particles from entering the torch thereby preventing burning of the inside of the torch 10. The entire check valve assembly is preferably constructed from polytetrafluoroethylene, which is non-conducting and inert to normal operating environments for this torch.

Communicating with fluid passage 48 is an aperture 52 wherein there is a sealing member 54. Sealing member 54 is a resilient seal having an inside diameter smaller than the outside diameter of the electrode normally used with this torch. Sealing member 54 is held in place by retaining ring 56 which in turn is held in place by electrode gripping members or shoes 58, 60. Gripping members 58, 60 are held in place by elastic ring 62. Gripping member 60 is of a conductive material such as copper and extends through a slot in head block 42 and is retained by cap 43, having a complimentary slot, by means of screws (not shown) extending through cap 43, head block 42 and fastened in body 16 which also position head block 42 to body 16 compressing sealing member 46. If the screws are of a conducting material, electrolysis thereof can be prevented by applying a non-conducting coating such as silicone rubber to the exposed portions. On the protruding end 64 of member 60 a suitable socket is formed to receive the conducting portion of waterproof electrical cable 66. The protruding end 64 of member 60 and the adjacent section of the covering of cable 66 are in turn covered with a suitable insulating cover 68 such as heat shrinkable, non-conducting tubing, such as vinyl or polyester tubing, to form a water-tight seal. Cable 66 is formed in a loop as shown in FIG. 1 and fastened to the fluid hose by a suitable clamp 70. The opposite end of cable 66 has a suitable fitting 72 for connection to an electrical power source (not shown). The hand loop formed by cable 66 and torch 10 aids in positioning and steadying the torch when in use. The loop also allows the operator to flex hand and fingers thereby minimizing fatigue and cramps due to the operating environment and at the same time retaining possession of the torch.

The bare end of electrode 80 is inserted so that is extends back into passage 48 containing check valve 50. This tends to stabilize the position of the electrode.

The lower gripping member or shoe 58 is complimentary in shape to upper member 60 but does not extend beyond sealing member 56. Both shoes 58, and 60 when assembled form a tapered circular aperture 74 with a transverse space or slot 76 across the aperture 74. As shown in FIG. 3, the shoes 58, 60 are forced apart to receive the bare end 82 of hollow coated electrode 80, the coating being shown as 84. The elastic ring 62 forces the shoes 58, 60 toward each other thereby tightly gripping the electrode 80. Sealing member 54 forms a seal around electrode 80 thereby preventing fluid leaking around the electrode.

In order to increase the life expectancy of the torch and operator safety, the exposed surfaces of shoe 60, except for electrode contact surface 73, can be coated with a non-conducting abrasion resistant material such as epoxy.

In the torch shown, only shoe 60 need be constructed from a conducting material such as a copper alloy. It is preferred handle 38, pin 40, screw 34, and fitting 24 be constructed from metals, for strength, ease in fabrication, and minimized expense of fabrication. Handle 38 is provided with a non-conducting abrasion-resistant coating also. The balance of the parts can be fabricated from known electrically insulating materials such as plastics thereby minimizing electrical arcing possibilities thus assuring greater operator safety. These materials make a more compact lightweight, easier-to-maintain torch. It also increases operator efficiency because of the torch being lightweight and compact.

In operation the torch 10 is connected to an electrical power supply (not shown) by means of fitting 72 in conductor 66 thereby providing power to grip or contact shoe 60 and hence to the electrode 80. Tubing or hose 76 is connected by means of a coupling 86 to a source of fluid such as oxygen gas under pressure. When under water the operator signals the person on a barge or land where the source of power and fluid are kept to turn on the current. He then can strike his arc and start gas flow through the electrode by pulling lever 38 toward body 16 and proceed to cut. When the electrode 80 is consumed he calls for power to be turned off and can readily change electrodes.

Shown attached to power cable 66 and hose 26 by means of clamps 94, 96 is an electrode extractor 98 having a general configuration of a T with an aperture 100 slightly larger in diameter than the electrode. If the used electrode stub is short, the extractor aperture 100 is placed over the stub and the stub can be readily removed. This allows more of the electrode to be consumed and provides ready access to a stub extractor. Normally an operator would require the use of pliers or another tool to remove the stub.

If the torch is to be used for welding a welding electrode of the same diameter as the cutting electrode is inserted between shoes 58, 60. The welding electrode is not hollow so no gas is required during welding. The torch can be adapted to electrodes of differing diameters by changing the contact shoes 58, 60 to provide the required size for aperture 74.

Figure 4:
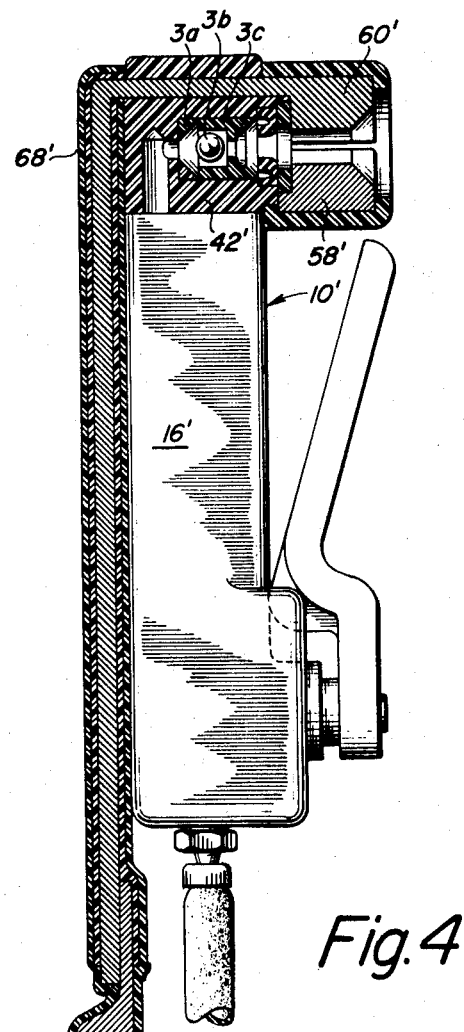
FIG. 4 is a side view partially in section illustrating an alternate embodiment of the present invention.

There is shown in FIG. 4 an alternate embodiment wherein electrical conductor 68' is affixed to torch 10' along one side of body 16' and head block 42'. This construction eliminates the hand loop of FIG. 2 if operator preference and operating conditions warrant.

Figure 5:
FIG. 5 is a partial cross-sectional view of a cable connector useable with the present invention.

FIG. 5 shows an alternate cable connector 88 for the end of cable 68' that is connected to the source of electrical power. Such connectors 88 are commercially available and have an electrical connector 90 sheathed in a waterproof covering 92 sealed to cable 68' to provide rapid water-tight connection to another cable with a suitable mating connector (not shown).

While the materials of construction are known, the use of such non-conducting materials for a major portion of an under-water torch has not been heretofore shown. Materials selection can vary depending upon the individual facilities available for molding and fabricating taking into account water absorption, strength, resistance to safe concentrations of oxygen, abrasion resistance and impact resistance of these materials.

It is also contemplated that the electrode shoes can be held in a rigid receptacle using an elastomeric block, wedge or the like against which one or both shoes can be moved.

The torch illustrated in FIGS. 1, 2, 3, and 4 has been found to be satisfactory for almost all underwater cutting and welding applications. It is possible however, that where the diver encounters heavy corrosion, barnacles, or other non-conductive coatings on the submerged article being cut he will severely strike, in hammer-like fashion, such a coating with the torch in order to initiate and maintain the arc. Such banging as it is called in the trade could lead to arcing of the electrode 80 to the conductive shoe 60.

In order to provide an even greater positive gripping force on the electrode there is shown in FIGS. 6 and 7 a torch 110 having a gas operating lever assembly 112 and a head assembly 114.

The torch 110 has a torch body 116 identical in structure to the torch body of FIG. 1 and 2.

The gas operating lever assembly 112 and the valve assembly shown as 120 are also identical with the gas operating lever assembly and valve assembly as described in connection with FIGS. 1 and 2.

Head assembly 114 is mounted on torch body 116 and includes a head block 122 affixed to body 116 as by screws 124, 126 (FIG. 6). Head block 122 includes a first fluid passage 128 communicating with fluid passage 118 in body 116. Sealing means 130, such as an "O-Ring," is included to prevent fluid leaks between the torch body 116 and the head block 122. Included in head block 122 is a second fluid passage 132 communicating with fluid passage 128 and having therein a check valve assembly 134 similar to the check valve assembly of the torch as shown in FIGS. 1 and 2.

Fluid passage 132 communicates with aperture 136 wherein is disposed electrode sealing member 138 which is held in place by retaining ring 140 which in turn is held in place by upper shoe 142 and lower shoe assembly 144.

Upper shoe 142 is of a conductive material such as copper and extends through a slot in head block 122 and is retained by cap 146 having a complimentary slot; cap 146 and head block 122 both affixed to body 116 by screws 124, 126. The screws 124, 126 are recessed in cap and covered with a silicone rubber to prevent contact of the screw head with the operating environment. On the protruding end 148 of upper show 142 there is formed a socket 150 having internal threads complimentary to a threaded connector 152 on electrical cable 154 so that the electrical cable 154 can be readily removed from the torch. The connection is covered by a suitable insulating cover 156 such as heat shrinkable, non-conducting vinyl or polyester tubing to form a water-tight seal. Cable 154 is formed in a loop similar to the loop shown and described in connection with FIG. 2.

Lower shoe assembly 144 includes a face member 160 having an electrode gripping member or shoe portion 161 complimentary to the electrode gripping portion of upper shoe 142 and a covering portion that covers upper shoe 142 on its upper and front exposed surfaces. Face member 160 has a horizontal slot 162 so constructed that when the face member 160 is affixed to the upper shoe 142 and by screw 164 the lower gripping portion of face member 160 can be moved toward and away from upper shoe 142 to grip the electrode. This motion is achieved by a lead screw device 166 actuated by knob 168. In effect the lead screw device 166, in conjunction with face member 160 and upper shoe 142, acts as a vise to securely grip the electrode. By manufacturing face member 160 from a resilient non-conducting material such as NYLON the self-hold feature of the elastic ring of the torch of FIG. 1 is achieved and reinforced by a positive vise-like holding feature included in the same structure.

Figure 8:
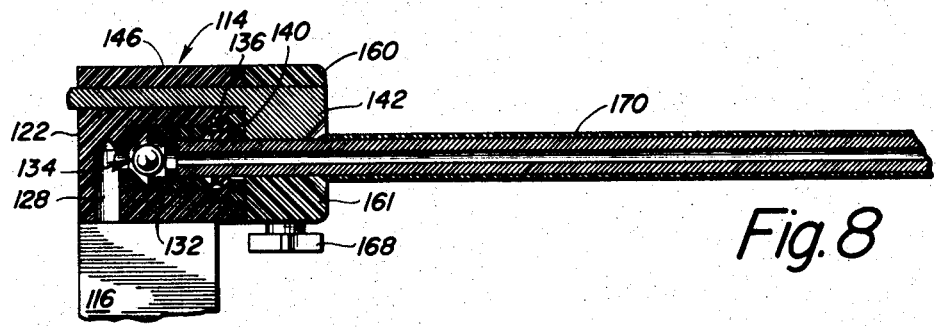
FIG. 8 is a fragmentary side view of the torch partially in section illustrating an electrode in operating position.

FIG. 8 shows an electrode 170 inserted in the torch by forcing apart shoe 142 and shoe 161 to initially seat the electrode. Knob 168 is then tightened to provide the added force to more firmly secure the electrode 170 to the torch.

Figure 9:
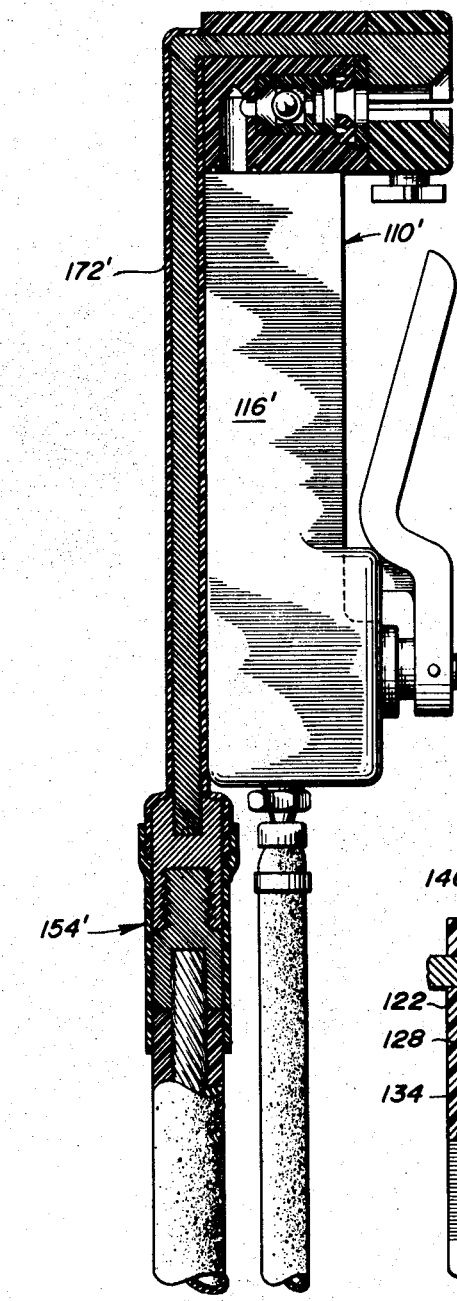
FIG. 9 is a side view partially in section illustrating a fourth embodiment of the present invention.

Torch 110' of FIG. 9 is identical to torch 110 of FIGS. 7 and 8 and illustrates a replaceable cable 154' affixed to the torch 110' in a manner similar to the embodiment of FIG. 4 by means of a covered conductor 172 affixed to the torch body 116'.

Figure 10:
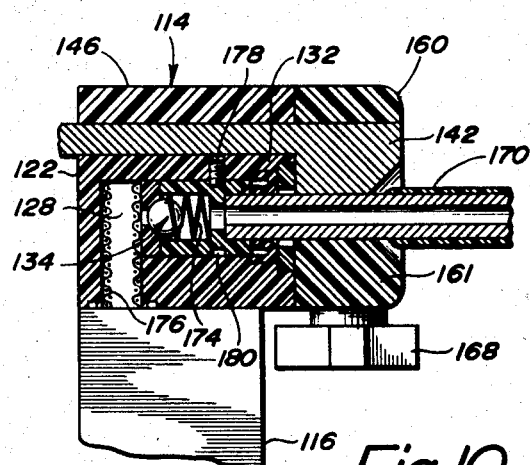
FIG. 10 is sectional view of a torch head detailing an alternate valve arrangement.

In FIG. 10 the check valve 134, body 3c is provided with a circumferential groove 180 for receiving a locking set screw 178 displaced in a mating threaded aperture in head block 122, thus insuring positive positioning of the valve. A spring 174 is disposed between the electrode backing surface of valve body 3c and the valve ball to provide a more positive seating of the ball when the flow of gas is turned off. There is also shown in FIG. 10 a screen or other mesh device 176 placed in fluid passage 128 which serves as a flash arrestor and a particle filter. These last two additions to the torch further enhance safety to the operator while the torch is in use.

As with torches of FIGS. 1–4 and the torches of FIGS. 6–9, only shoe 142 need be constructed from a conducting material such as copper or a copper alloy. It is also preferred that the gas operating lever handle, hinge pin, and valve screw be of metallic materials as well as head screws 124, 126. The handle is provided with a non-conducting abrasion resistant coating and all exposed metallic surfaces are coated with non-conducting coatings.

Having thus described our invention, the following claims set forth what we desire to be secured by Letters Patent of the United States.

We claim:

1. An underwater cutting and welding torch comprising in combination:
    a torch body having a fluid passage therethrough;
    valve means in said body for controlling the flow of fluid through said passage;
    a torch head in fluid-tight relation to said body, said head having a fluid passage communicating with the passage in said body on one end and with electrode holding means on said other end;
    said electrode holding means having a first electrically conductive electrode clamping member secured by said head and a second resiliently deformable non-conductive electrode clamping member affixed to said head and surrounding said first electrode clamping member, said clamping members being constructed to exert a vise-like grip on said electrode;
    positive clamping means in said second electrode clamping member to provide more positive clamping of said electrode;
    means for bringing electrical current to said first electrode holding member; and
    means for introducing fluid to said torch body passage.

2. A torch according to claim 1 wherein there is included in said fluid passage in said head a spring loaded check valve constructed from inert materials for preventing back flow of fluid and other foreign objects into said torch body.

3. A torch according to claim 1 wherein said valve means includes a lever pivotably connected to a valve stem projecting from said body whereby an operator may control the flow of fluid through said torch.

4. A torch according to claim 1 wherein there is included sealing means associated with said electrode clamping means to provide a substantially fluid-tight seal around the periphery of said electrode.

* * * * *